(12) United States Patent
Lan et al.

(10) Patent No.: US 12,506,938 B2
(45) Date of Patent: Dec. 23, 2025

(54) INTERFERENCE FRINGE CORRECTION METHOD AND UNDER-SCREEN SYSTEM

(71) Applicant: ORBBEC INC., Guangdong (CN)

(72) Inventors: Fuyang Lan, Shenzhen (CN); Zhaomin Wang, Shenzhen (CN); Peng Yang, Shenzhen (CN); Yuanhao Huang, Shenzhen (CN); Zhenzhong Xiao, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 245 days.

(21) Appl. No.: 18/221,662

(22) Filed: Jul. 13, 2023

(65) Prior Publication Data

US 2023/0370730 A1 Nov. 16, 2023

Related U.S. Application Data

(63) Continuation of application No. PCT/CN2021/107941, filed on Jul. 22, 2021.

(30) Foreign Application Priority Data

Mar. 24, 2021 (CN) .......................... 202110316128.9

(51) Int. Cl.
*H04N 23/20* (2023.01)
*H04N 23/74* (2023.01)
*H04N 23/81* (2023.01)

(52) U.S. Cl.
CPC .............. *H04N 23/20* (2023.01); *H04N 23/74* (2023.01); *H04N 23/81* (2023.01)

(58) Field of Classification Search
CPC ........ H04N 23/20; H04N 23/74; H04N 23/81; H04N 9/646; G06T 2207/10048; G06T 5/80; G06T 7/514; G06T 7/521

(Continued)

(56) References Cited

U.S. PATENT DOCUMENTS

2012/0288175 A1 11/2012 Iwase et al.
2014/0153645 A1* 6/2014 Zhang ................. H04N 19/513
375/240.12

(Continued)

FOREIGN PATENT DOCUMENTS

CN 103778887 A 5/2014
CN 110024020 A 7/2019

(Continued)

OTHER PUBLICATIONS

PCT International Search Report and the Written Opinion mailed Dec. 21, 2021, issued in related International Application No. PCT/CN2021/107941, with partial English translation (9 pages).

*Primary Examiner* — Lin Ye
*Assistant Examiner* — Chan T Nguyen
(74) *Attorney, Agent, or Firm* — Sheppard Mullin Richter & Hampton LLP

(57) ABSTRACT

A method for correcting interference fringes includes: obtaining correction parameter sets of different photographing distances; obtaining a to-be-corrected image and calculating an average depth value of the to-be-corrected image; selecting a target correction parameter set corresponding to the average depth value from the correction parameter sets of different photographing distances; and correcting first pixel values of to-be-corrected pixels at the different coordinate positions in the to-be-corrected image according to different target correction parameters corresponding to the different coordinate positions in the target correction parameter set, to obtain a corrected image. Each of the correction parameter sets includes different correction parameters corresponding to different coordinate positions. The average depth value includes an average value of depth values corresponding to a plurality of to-be-corrected pixels in the to-be-corrected image.

20 Claims, 10 Drawing Sheets

(58) Field of Classification Search
USPC .......................................................... 348/241
See application file for complete search history.

(56) References Cited

U.S. PATENT DOCUMENTS

| | | | |
|---|---|---|---|
| 2015/0302570 | A1* | 10/2015 | Shirakyan .................. G06T 7/80 |
| | | | 348/46 |
| 2018/0144716 | A1 | 5/2018 | Jung et al. |
| 2018/0157328 | A1* | 6/2018 | Brunner .................... G06T 7/50 |

FOREIGN PATENT DOCUMENTS

| | | |
|---|---|---|
| CN | 111489694 A | 8/2020 |
| CN | 112202986 A | 1/2021 |
| CN | 112511761 A | 3/2021 |

\* cited by examiner

INTERFERENCE FRINGE CORRECTION METHOD AND UNDER-SCREEN SYSTEM

CROSS-REFERENCE TO RELATED APPLICATIONS

This application is a Continuation Application of International Patent Application No. PCT/CN2021/107941 filed with the China National Intellectual Property Administration (CNIPA) on Jul. 22, 2021, which is based on and claims priority to and benefits of Chinese Patent Application No. 202110316128.9, filed on Mar. 24, 2021. The entire content of all of the above-referenced applications is incorporated herein by reference.

TECHNICAL FIELD

This application relates to the technologies field of image processing, and in particular, to an interference fringe correction method and an under-screen system.

BACKGROUND

With continuous optimization of full screens by mobile phone manufacturers, an under-screen camera module will become a standard configuration of most mobile phones. An imaging principle of the under-screen camera module is as follows: an irradiation source (for example: an infrared laser) in the under-screen camera module supplements light of a target region through a screen, and an acquisition module (for example: a camera) in the under-screen camera module photographs an irradiated object to obtain an infrared image.

However, due to physical characteristics of a display screen, a beam emitted by the irradiation source is divided into a plurality of beams through the screen, some of the beams are directly emitted through the display screen, and the other beams have different phase delays due to reflection on the display screen. The plurality of beams meet and superpose on the target region to generate interference fringes, which leads to poor image quality.

SUMMARY

In view of this, embodiments of this application provide a method for correcting interference fringes, an under-screen system, and a non-transitory computer-readable storage medium, to resolve a technical problem that a plurality of beams meet and superpose on a target region to generate interference fringes, resulting in poor image quality.

According to a first aspect of the embodiments of this application, a method for correcting interference fringes is provided. The method includes:
  obtaining a correction parameter sets of different photographing distances, where each of the correction parameter sets includes different correction parameters corresponding to different coordinate positions;
  obtaining a to-be-corrected image and calculating an average depth value of the to-be-corrected image, where the average depth value includes an average value of depth values corresponding to a plurality of to-be-corrected pixels in the to-be-corrected image;
  selecting a target correction parameter set corresponding to the average depth value from the correction parameter sets of different photographing distances; and
  correcting first pixel values of to-be-corrected pixels at the different coordinate positions in the to-be-corrected image according to different target correction parameters corresponding to the different coordinate positions in the target correction parameter set, to obtain a corrected image.

According to a second aspect of the embodiments of this application, an under-screen system is provided, including: a display screen, an irradiation source, a camera, a processor, and a memory; where
  the irradiation source is configured to emit a beam to a target region through the display screen;
  the camera is configured to receive an optical signal that passes through the display screen after being reflected by the target region, obtain an infrared image of the target region, and transmit the infrared image to the processor;
  the processor is configured to correct the infrared image by using correction parameter sets and the method for correcting interference fringes described in any of the foregoing embodiments; and
  the memory is configured to store the correction parameter sets and a computer program executable on the processor.

According to a third aspect of the embodiments of this application, a non-transitory computer-readable storage medium is provided. The non-transitory computer-readable storage medium stores a computer program, and the computer program, when executed by a processor, causes the processor to implement steps of the method for correcting interference fringes described in the first aspect.

Compared with the related art, the embodiments of this application have the following beneficial effects. Because interference fringes are usually alternately dark and bright fringes, and interference fringes with different depth values in a to-be-corrected image have different positions, a target correction parameter set is selected according to an average depth value of the to-be-corrected image in this application. Target correction parameters corresponding to the to-be-corrected pixels at different coordinate positions are obtained according to the target correction parameter set, and first pixel values of the to-be-corrected pixels are corrected according to the target correction parameters. According to the foregoing manner, the first pixel values of the to-be-corrected pixels at different coordinate positions in the to-be-corrected image are adjusted based on the target correction parameter set corresponding to the average depth value, so as to alleviate the defect of poor image quality caused by the interference fringes.

BRIEF DESCRIPTION OF THE DRAWINGS

To describe the technical solutions in the embodiments of this application more clearly, the following briefly introduces the accompanying drawings required for describing the embodiments or the related art. Apparently, the accompanying drawings in the following description show merely some embodiments of this application, and a person of ordinary skill in the art may still derive other accompanying drawings from these accompanying drawings without creative efforts.

DETAILED DESCRIPTION

In the following description, for the purpose of illustration rather than limitation, details such as the system structure and technology are proposed to thoroughly understand the embodiments of this application. However, a person skilled in the art knows that this application may be implemented in other embodiments without these details. In other cases, detailed descriptions of well-known systems, apparatuses, circuits, and methods are omitted to avoid unnecessary details hindering the description of this application.

For better understanding of the technical problems resolved in this application, the background technology is further explained herein.

Interference is a phenomenon in which two (or more) waves of a same amplitude, a same frequency, and difference phases are combined to cause a redistribution of vibration intensities. In a superposition region of the waves, the amplitude increases at some points and decreases at other points, and high and low vibration intensities are in a fixed distribution in space, resulting in interference fringes.

In the existing technologies, in an imaging process of an under-screen camera (the under-screen camera module includes an irradiation source and an acquisition module, e.g., a camera), the irradiation source generates a first beam and a second beam when passing through a display screen. There is a fixed phase difference between the first beam and the second beam. Therefore, the first beam and the second beam interfere stably in a receiving plane (namely, a target region) to generate interference fringes. The interference fringes may shift as a photographing distance between the target region and the under-screen camera module changes. The interference fringes in infrared images acquired by the acquisition module at different photographing distances translate in a parallax direction.

In view of this, embodiments of this application provide an interference fringe correction method, an under-screen system, and a computer-readable storage medium, to resolve the foregoing technical problems.

Figure 1:
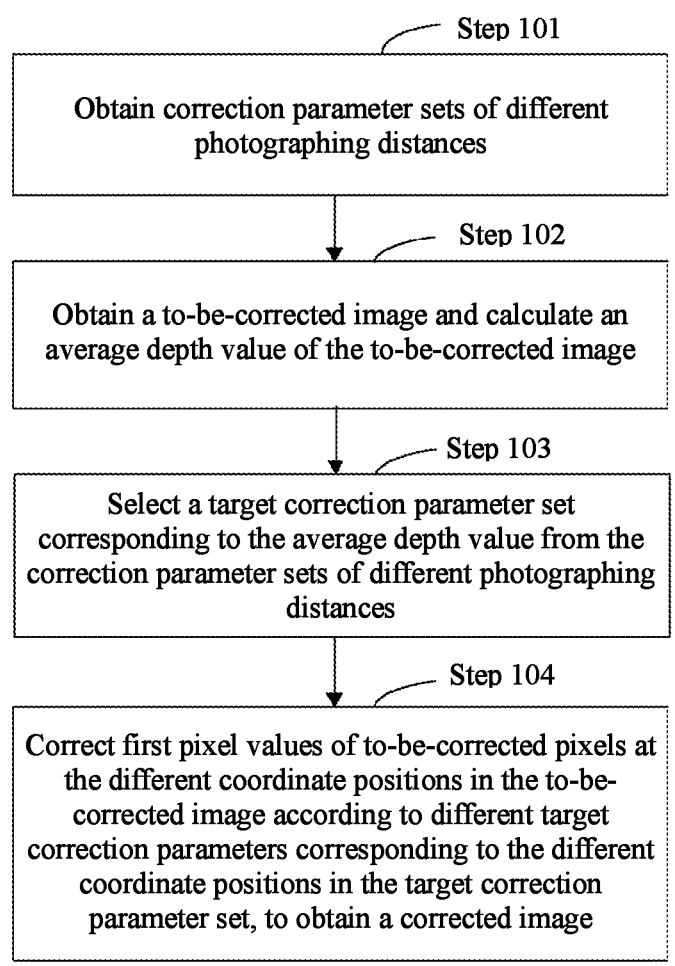
FIG. 1 is a schematic flowchart of an interference fringe correction method according to this application.

Referring to FIG. 1, FIG. 1 is a schematic flowchart of an interference fringe correction method according to this application. As shown in FIG. 1, the correction method includes the following steps.

Step 101: Obtain correction parameter sets of different photographing distances, wherein each of the correction parameter sets includes different correction parameters corresponding to different coordinate positions.

As is known to all, distribution positions of the interference fringes at different photographing distances are shifted in the images, while the sizes are the same. The distribution positions of the interference fringes at the same photographing distance are consistent in the images. If distribution positions of the interference fringes in the image can be determined, the interference fringes can be eliminated. Therefore, based on the above rules, in this application, the correction parameter sets of different photographing distances are obtained to adaptively correct to-be-corrected pixels in a to-be-corrected image. A policy for dividing different photographing distances may be uniform division and non-uniform division, and intervals for different photographing distances may be preset according to correction fineness.

The correction parameter set includes correction parameters corresponding to different coordinate positions in an image corresponding to a same target plane. The correction parameter is used for enhancing a pixel value or weakening a pixel value or provides no correction (that is, the correction parameter is 1). Because the interference fringes are alternately dark and bright fringes, pixel values of pixels in a dark region need to be enhanced, and pixel values of pixels in a bright region need to be weakened.

In step 101, the correction parameter sets may be pre-stored data. During step 101, it is only necessary to obtain the correction parameter sets pre-stored in a memory.

Figure 2:
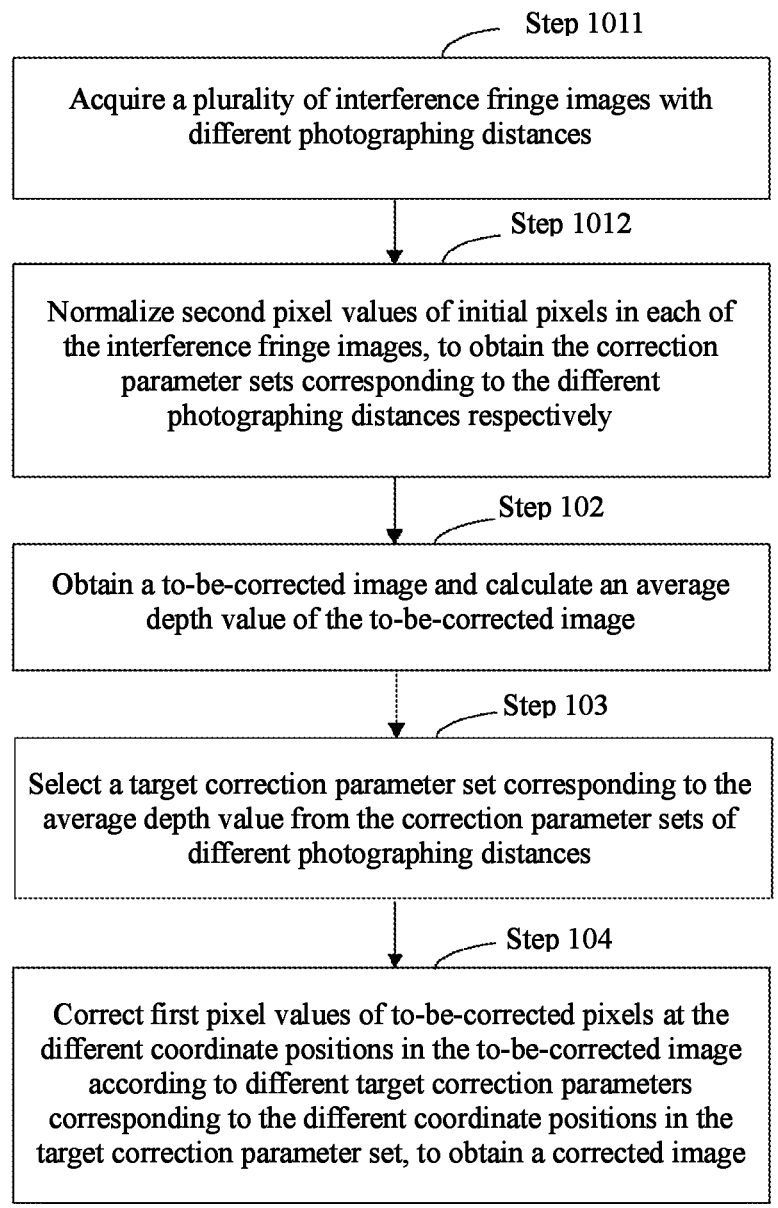
FIG. 2 is a schematic flowchart of step 101 in an interference fringe correction method according to this application.

In an embodiment, in step 101, the correction parameter sets may be obtained through the following embodiment (the pre-stored correction parameter sets also need to be obtained by pre-calculation through the following embodiment):

In an embodiment of this application, step 101 includes step 1011 to step 1012 as follows. Referring to FIG. 2, FIG. 2 is a schematic flowchart of step 101 in an interference fringe correction method according to this application.

Step 1011: Acquire a plurality of interference fringe images with different photographing distances, where the interference fringe image refers to an image acquired by an acquisition module after a light source irradiates a target plane through a display screen to form interference fringes, the photographing distance refers to a distance between a plane perpendicular to an optical axis of the acquisition module and the acquisition module, and the interference fringe images represent second pixel values of the interference fringes at different coordinate positions.

The target plane perpendicular to the optical axis of the acquisition module or an optical axis of an irradiation source. The target plane may be used for reflecting interference fringes generated by the irradiation source through the screen (the irradiation source includes, but is not limited to, a laser light source, an LED light source or the like), and a size of the target plane is larger than a field of view of the acquisition module at different photographing distances. The acquisition module acquires the interference fringes appearing on the target plane to obtain the interference fringe image.

In order to better represent the second pixel values of the interference fringes at different coordinate positions, a plane with white background and uniform surface texture is selected as the target plane.

Figure 3:
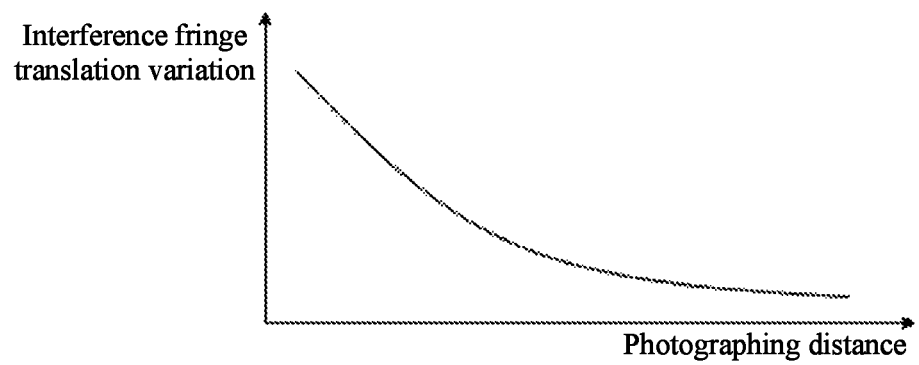
FIG. 3 is a schematic diagram of an interference fringe translation variation curve according to this application.

A policy for dividing different photographing distances may be uniform division and non-uniform division, and intervals for different photographing distances may be preset according to correction fineness. It is difficult to detect that, when the target plane moves back and forth along an optical axis direction in a region close to the acquisition module, a translation variation of the interference fringes on the target plane is large. When the target plane moves back and forth along the optical axis direction in a region away from the acquisition module, a translation variation of the interference fringes on the target plane is small. Referring to FIG. 3, FIG. 3 is a schematic diagram of an interference fringe translation variation curve according to this application. As shown in FIG. 3, a ratio between the fringe translation variation and the photographing distance decreases in a curvilinear manner.

Figure 4:
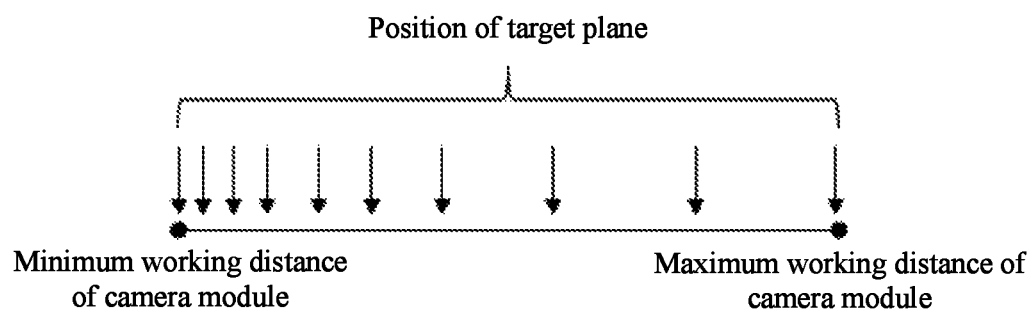
FIG. 4 is a schematic diagram of a division policy for photographing distances according to this application.

Therefore, based on the above rules, the division policy for different photographing distances in this application is "dense in the near distance and sparse in the far distance." Referring to FIG. 4, FIG. 4 is a schematic diagram of a division policy for photographing distances according to this application. As shown in FIG. 4, as the target plane moves away from the acquisition module, sampling positions of the target plane gradually become sparse, to scientifically divide the distribution density of the photographing distance.

In an embodiment of this application, one or more original images can be acquired at the same photographing distance to serve as one or more interference fringe images. When there are a plurality of interference fringe images, multi-frame averaging can be performed to obtain a final interference fringe image. In an embodiment of this application, after the interference fringe image is obtained, the interference fringe image can be preprocessed to improve the image quality of the interference fringe image, thereby obtaining a more precise correction effect. The preprocessing includes image processing means such as noise reduction or grayscale value adjustment.

Step 1012: Normalize second pixel values of initial pixels in each of the interference fringe images, to obtain the correction parameter sets corresponding to the different photographing distances respectively.

The interference fringes are alternately dark and bright fringes, where the pixel values are higher in the bright fringe region and lower in the dark fringe region. Therefore, in this application, the second pixel values of the initial pixels in each of the interference fringe images are normalized to obtain the correction parameter sets corresponding to the different photographing distances respectively. The process is as follows.

Figure 5:
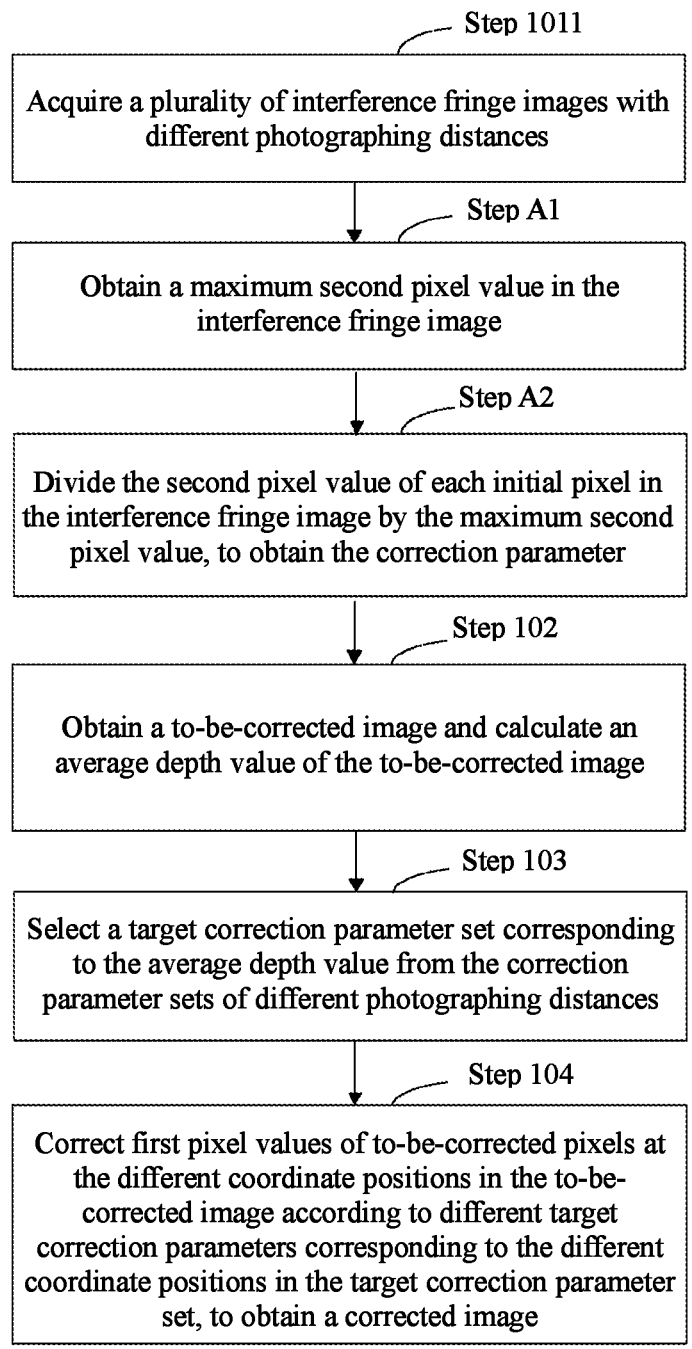
FIG. 5 is a schematic flowchart of step 1012 in an interference fringe correction method according to this application.

In an embodiment of this application, step 1012 includes steps A1 to step A2 as follows. Referring to FIG. 5, FIG. 5 is a schematic flowchart of step 1012 in an interference fringe correction method according to this application.

For the interference fringe image corresponding to each photographing distance, the following steps are performed to obtain correction parameter sets corresponding to different photographing distances respectively.

Step A1: Obtain a maximum second pixel value in the interference fringe image.

Step A2: Divide each of second pixel values of each of initial pixels in the interference fringe image by the maximum second pixel value, to obtain the correction parameter set.

For each of initial pixels in the interference fringe image, the correction parameter set is obtained by using the following formula:

$$I_a = \frac{I_b}{M},$$

M represents a maximum second pixel value, $I_a$ represents a correction parameter in the correction parameter set, and $I_b$ represents a second pixel value of an initial pixel.

The correction parameters at different coordinate positions in the correction parameter set obtained by the foregoing formula are in the range of [0, 1].

Step 102: Obtain a to-be-corrected image and calculate an average depth value of the to-be-corrected image, where the average depth value refers to an average value of depth values corresponding to a plurality of to-be-corrected pixels in the to-be-corrected image.

The to-be-corrected image in the target region is obtained, and the depth values of the plurality of to-be-corrected pixels in the to-be-corrected image are calculated. Then, the depth values of the plurality of to-be-corrected pixels are averaged to obtain the average depth value.

There are three methods for calculating the depth values of the plurality of to-be-corrected pixels.

Method 1: The irradiation source projects a structured light beam to the target region, and the acquisition module receives a beam reflected from the target region to generate an electrical signal. The electric signal is transmitted to a processor. The processor processes the electrical signal to calculate information representing the intensity of the beam to form a structured light pattern, and finally performs matching calculation or triangulation calculation based on the structured light pattern to obtain the depth values of the plurality of to-be-corrected pixels.

Method 2: The irradiation source projects an infrared beam to the target region, and the acquisition module receives a beam reflected from the target region to generate an electrical signal. The electrical signal is transmitted to the processor. The processor processes the electrical signal to calculate a phase difference, indirectly calculates, based on the phase difference, a time of flight for the beam to travel from the irradiation source to the acquisition module, and further calculates the depth values of the plurality of to-be-corrected pixels based on the time of flight. It should be understood that the infrared beam may include a pulse type and a continuous wave type, which is not limited herein.

Method 3: The irradiation source projects an infrared pulsed beam to a target object, and the acquisition module receives a beam reflected by the target object to generate electrical signals. The electrical signals are transmitted to the processor. The processor counts the electrical signals to obtain a waveform histogram, directly calculates, according to the histogram, a time of flight for the beam to travel from the irradiation source to the acquisition module, and further calculates the depth values of the plurality of to-be-corrected pixels based on the time of flight.

Step 103: Select a target correction parameter set corresponding to the average depth value from the correction parameter sets of different photographing distances.

It may be understood that if a distribution interval between different photographing distances is small enough, each average depth value may correspond to an equal photographing distance. If the distribution interval between different photographing distances is not small enough, the average depth value may not be completely equal to the photographing distance. When there is a photographing distance equal to the average depth value in the different photographing distances, a target correction parameter set corresponding to the photographing distance equal to the average depth value is selected.

Figure 6:
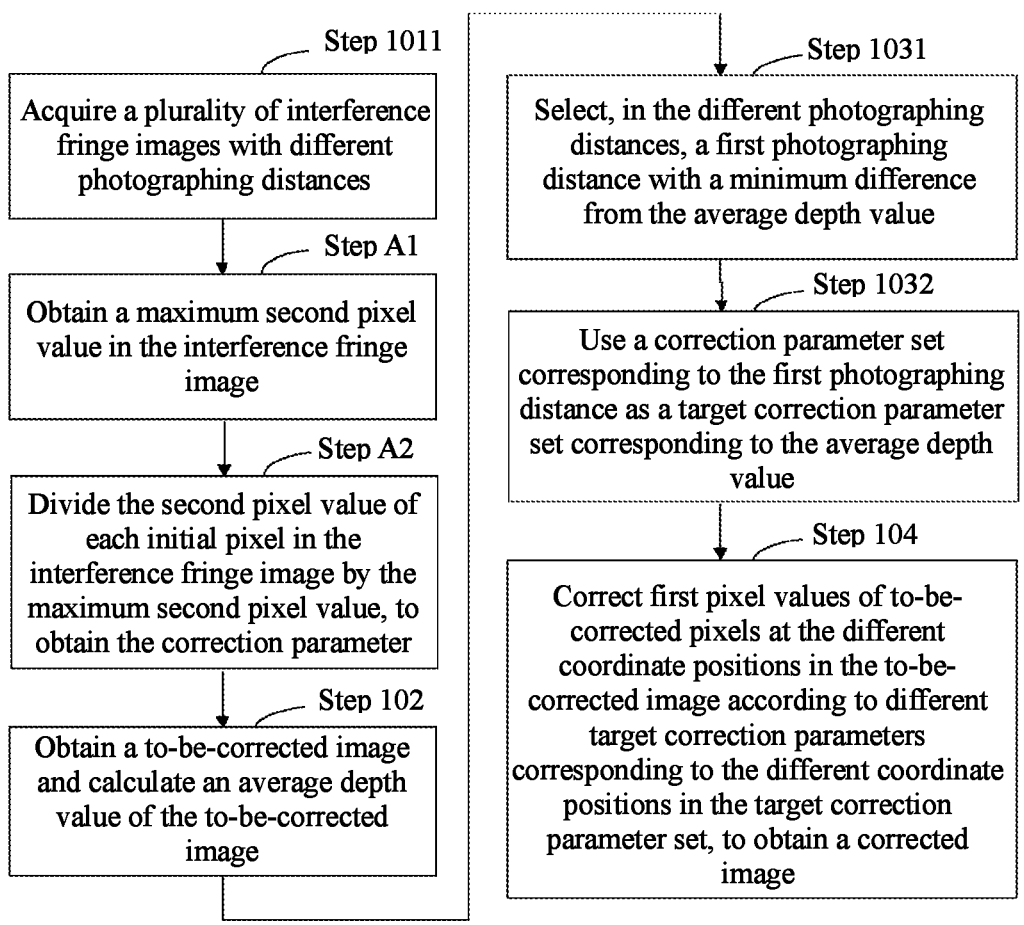
FIG. 6 is a schematic flowchart of step 103 in an interference fringe correction method according to this application.

When there is no photographing distance equal to the average depth value in the different photographing distances, the following embodiment is performed. In an embodiment of this application, step 103 includes step 1031 to step 1032 as follows. Referring to FIG. 6, FIG. 6 is a schematic flowchart of step 103 in an interference fringe correction method according to this application.

Step 1031: Select, in the different photographing distances, a first photographing distance with a minimum difference from the average depth value.

Step 1032: Use a correction parameter set corresponding to the first photographing distance as a target correction parameter set corresponding to the average depth value.

It may be understood that the above condition "if a distribution interval between different photographing distances is small enough" is also applicable to step 1031 and step 1032, that is, the difference under this condition is 0.

Step 104: Correct first pixel values of to-be-corrected pixels at the different coordinate positions in the to-be-corrected image according to different target correction parameters corresponding to the different coordinate positions in the target correction parameter set, to obtain a corrected image.

Because the depth values of different to-be-corrected pixels in the corrected image are different, and the photographing distances (that is, depth values) of the correction parameters in the correction parameter set are uniform, the depth values of different to-be-corrected pixels may be inconsistent with the depth values of respective correction parameters corresponding to the different to-be-corrected pixels. In order to make the depth values of the to-be-corrected pixels consistent with the depth values of the corresponding correction parameters, each target correction parameter is converted in this application. The converting process is shown in the following embodiment.

Figure 7:
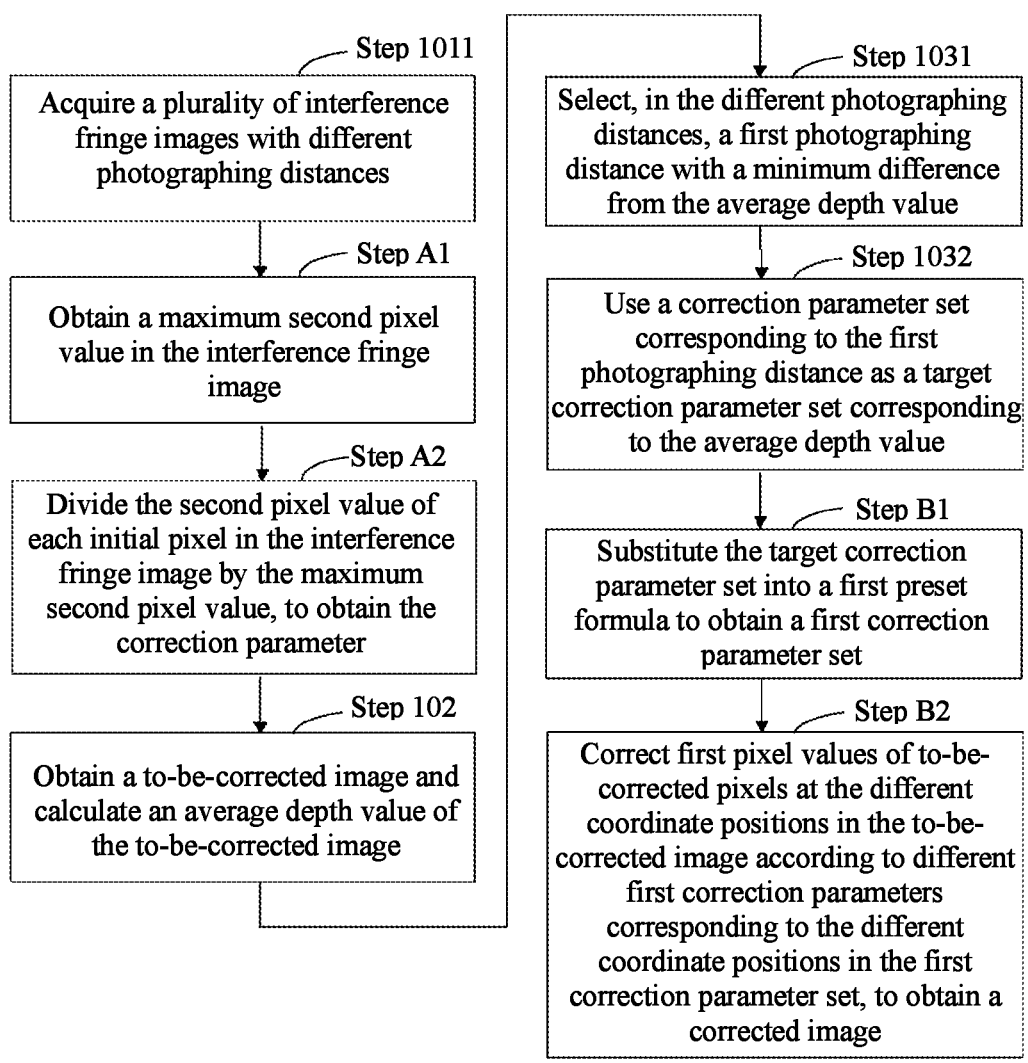
FIG. 7 is a schematic flowchart of step 103 in an interference fringe correction method according to this application.

In an embodiment of this application, step 104 includes steps B1 to step B2 as follows. Referring to FIG. 7, FIG. 7 is a schematic flowchart of step 103 in an interference fringe correction method according to this application.

Step B1: Substitute the target correction parameter set into a first preset formula to obtain a first correction parameter set.

Because there is a difference between the average depth value and the photographing distance, the target correction parameter set needs to be corrected by using the first preset formula.

The first preset formula is as follows:

$$I_b = I_a \left(\frac{L_a}{L_b}\right)^2$$

$I_a$ represents a target correction parameter in the target correction parameter set, $I_b$ represents a first correction parameter in the first correction parameter set, $L_a$ represents a photographing distance corresponding to the first correction parameter set, and $L_b$ represents the average depth value.

Step B2: Correct the first pixel values of the to-be-corrected pixels at the different coordinate positions in the to-be-corrected image according to different first correction parameters corresponding to the different coordinate positions in the first correction parameter set, to obtain a corrected image.

In step B2, the first pixel values of the plurality of to-be-corrected pixels may be divided by the respective first correction parameters corresponding to the plurality of to-be-corrected pixels to obtain the corrected image.

In an embodiment, in step B2, the first pixel values of the plurality of to-be-corrected pixels may be divided by the respective first correction parameters corresponding to the plurality of to-be-corrected pixels, and then multiplied by a preset adjustment coefficient (the adjustment coefficient is used for adjusting correction intensity and can be preset according to an actual application scenario) to obtain the corrected image.

Figure 8:
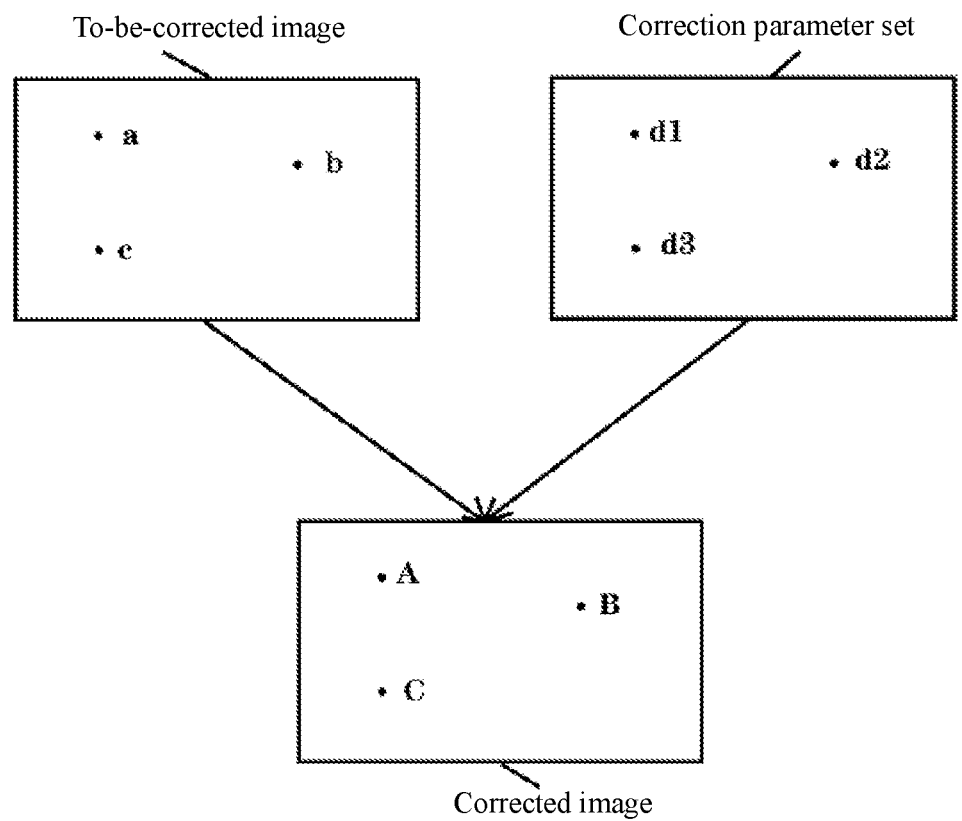
FIG. 8 is a schematic diagram of a correction process according to this application.

For better illustration of the correction process of step B2, referring to FIG. 8, FIG. 8 is a schematic diagram of the correction process according to this application. As shown in FIG. 8, to-be-corrected pixel a, to-be-corrected pixel b, and to-be-corrected pixel c in a to-be-corrected image are taken as examples. The to-be-corrected image corresponds to a unique correction parameter set (that is, a target correction parameter set). It may be understood that the correction parameter set is also an image, except that second pixel values at different coordinate positions in the image are correction parameters. The coordinate position of to-be-corrected pixel a is the same as that of pixel d1, the coordinate position of to-be-corrected pixel b is the same as that of pixel d2, and the coordinate position of to-be-corrected pixel c is the same as that of pixel d3. A first pixel value of to-be-corrected pixel a is divided by a second pixel value of pixel d1 (that is, a correction parameter) to obtain corrected pixel A. A first pixel value of to-be-corrected pixel b is divided by a second pixel value of pixel d2 (that is, a correction parameter) to obtain corrected pixel B. A first pixel value of to-be-corrected pixel c is divided by a second pixel value of pixel d3 (that is, a correction parameter) to obtain corrected pixel C.

It should be noted that, FIG. 8 serves as an example only. A quantity of corrected pixels in the correction parameter set, a quantity of to-be-corrected pixels, and positions of to-be-corrected pixels in the to-be-corrected image in FIG. 8 are not limited.

Figure 9:
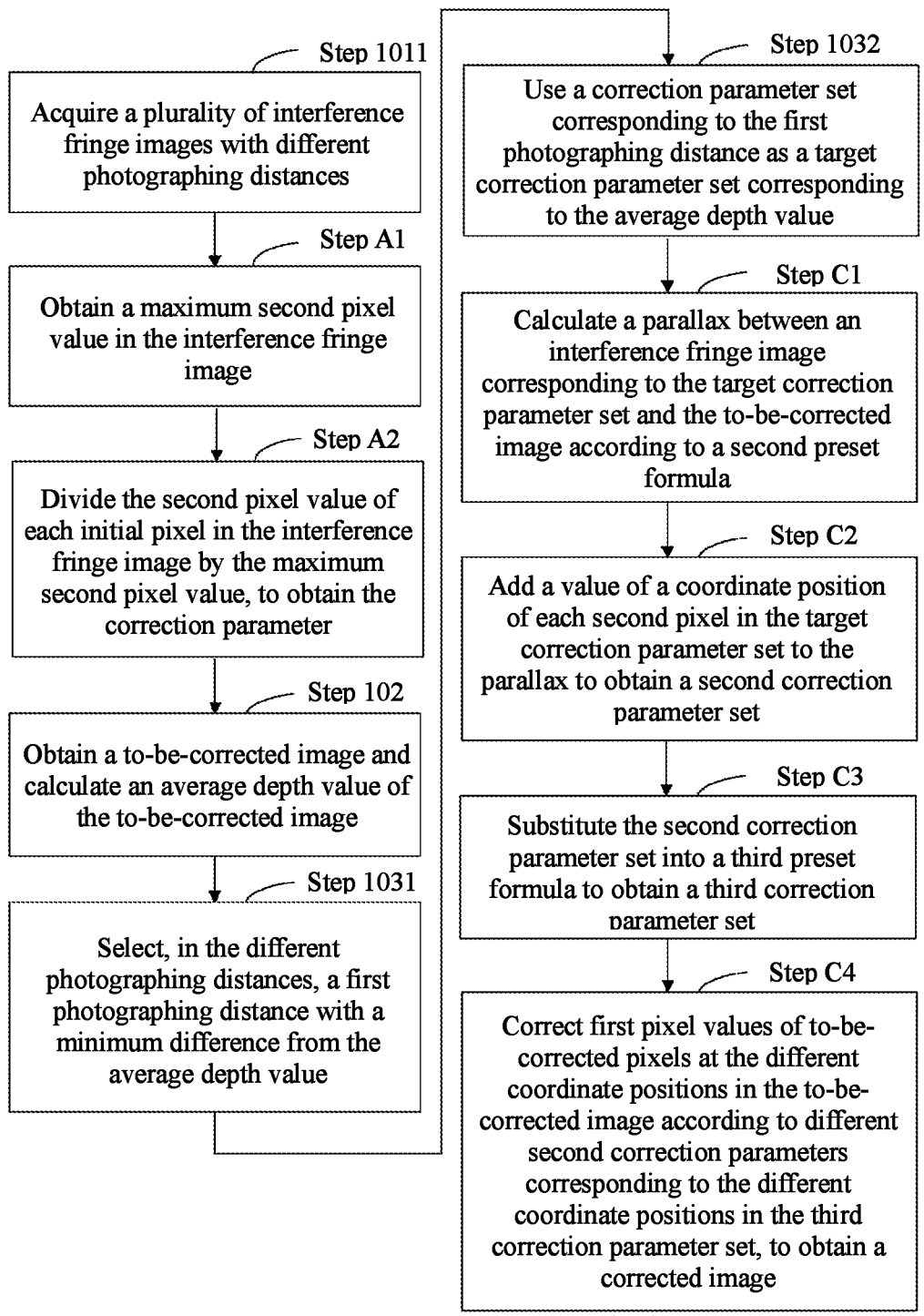
FIG. 9 is a schematic flowchart of step 104 in an interference fringe correction method according to this application.

In an embodiment of this application, step 104 includes steps C1 to step C4 as follows. Referring to FIG. 9, FIG. 9 is a schematic flowchart of step 104 in an interference fringe correction method according to this application.

Step C1: Calculate a parallax between an interference fringe image corresponding to the target correction parameter set and the to-be-corrected image according to a second preset formula.

Figure 10A:
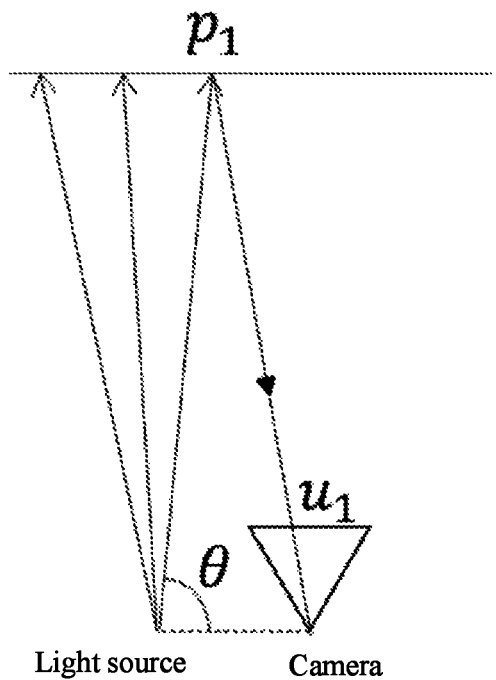
FIG. 10a is a schematic diagram of light reflection according to this application.
Figure 10B:
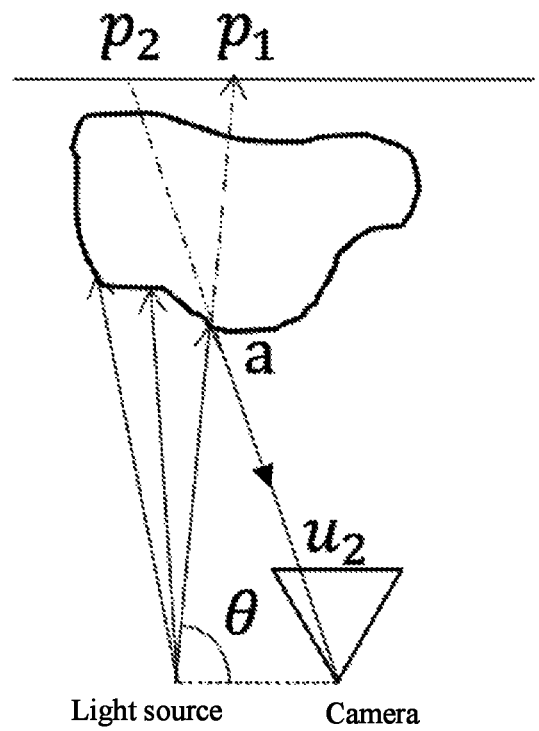
FIG. 10b is a schematic diagram of light reflection according to this application.

In the under-screen camera module, the acquisition module and the irradiation source are usually aligned, that is, located at different positions. Referring to FIG. 10a, FIG. 10a is a schematic diagram of light reflection according to this application. As shown in FIG. 10a, a straight line represents a target plane. When an irradiation source emits light on the target plane, the light is reflected from the target plane to the acquisition module. Because the position of the acquisition module is different from that of the irradiation source, paths of the emitted light and reflected light are different. However, the average depth value may not match a completely equal photographing distance. If the average depth value is not equal to the photographing distance, the coordinate position of the correction parameter has a certain deviation. Referring to FIG. 10b, FIG. 10b is a schematic diagram of light reflection according to this application. As shown in FIG. 10b, an irregular pattern is a target region (that is, a foreground) in the to-be-corrected image, and point a maps one pixel in the to-be-corrected image. A straight line represents a target plane. Since paths of the emitted light and reflected light are different, if a camera corrects a first pixel at point a with a correction parameter of point p2 that matches with the reflected light, the result is incorrect (the first pixel at point a should be corrected with a correction parameter of point p1).

Based on the foregoing consideration, the target correction parameter set is reconstructed in this application, that is, a mapping relationship between the correction parameters in the target correction parameter set and the coordinate positions is reconstructed to correct a position deviation. In this way, the first pixel at point a can be corrected by using the correction parameter of point p1.

First, a parallax caused by the positions of the irradiation source and the camera is calculated according to a second preset formula, where the second preset formula is as follows:

$$d = \left(1 - \frac{L_a}{L_b}\right)\frac{fb}{L_a},$$

d represents the parallax, $L_a$ represents a photographing distance corresponding to the target correction parameter set, $L_b$ represents the average depth value, b represents an optical axis distance between the camera and the irradiation source in the camera module, and f represents a focal length of the camera module.

Step C2. Add a value of a coordinate position of each second pixel in the target correction parameter set to the parallax to obtain a second correction parameter set.

If the parallax is in an X-axis direction, the parallax is added to an X-axis value in the coordinate position to obtain the second correction parameter set. If the parallax is in a Y-axis direction, the parallax is added to a Y-axis value in the coordinate position to obtain the second correction parameter set. It is worth noting that, when the position of the acquisition module is the same as that of the irradiation source, step C1 to step C2 can be omitted. Step C3: Substitute the second correction parameter set into a third preset formula to obtain the third correction parameter set. The third preset formula is as follows:

$$I_d = I_c \left(\frac{L_a}{L_b}\right)^2,$$

$I_c$ represents the second correction parameter set, $I_d$ represents the third correction parameter set, $L_a$ represents a photographing distance corresponding to the target correction parameter set, and $L_b$ represents an average depth value.

Step C4: Correct first pixel values of to-be-corrected pixels at the different coordinate positions in the to-be-corrected image according to different second correction parameters corresponding to the different coordinate positions in the third correction parameter set, to obtain a corrected image.

Step C2 to step C4 are the same as step B1 to step B2 in the foregoing embodiment, and reference is made to step B1 to step B2 in the foregoing embodiment. Details are not described herein again.

In this embodiment, the target correction parameter set is obtained through the average depth value of the first pixels. A target correction parameter in the target correction parameter set is obtained according to a second pixel position of the first pixel, and a first pixel value of the first pixel is corrected according to the target correction parameter. In the foregoing manner, the first pixel values of the first pixels at different positions are adjusted based on the average depth value to alleviate the problem of poor quality of an acquired image caused by the interference fringes.

Figure 11:
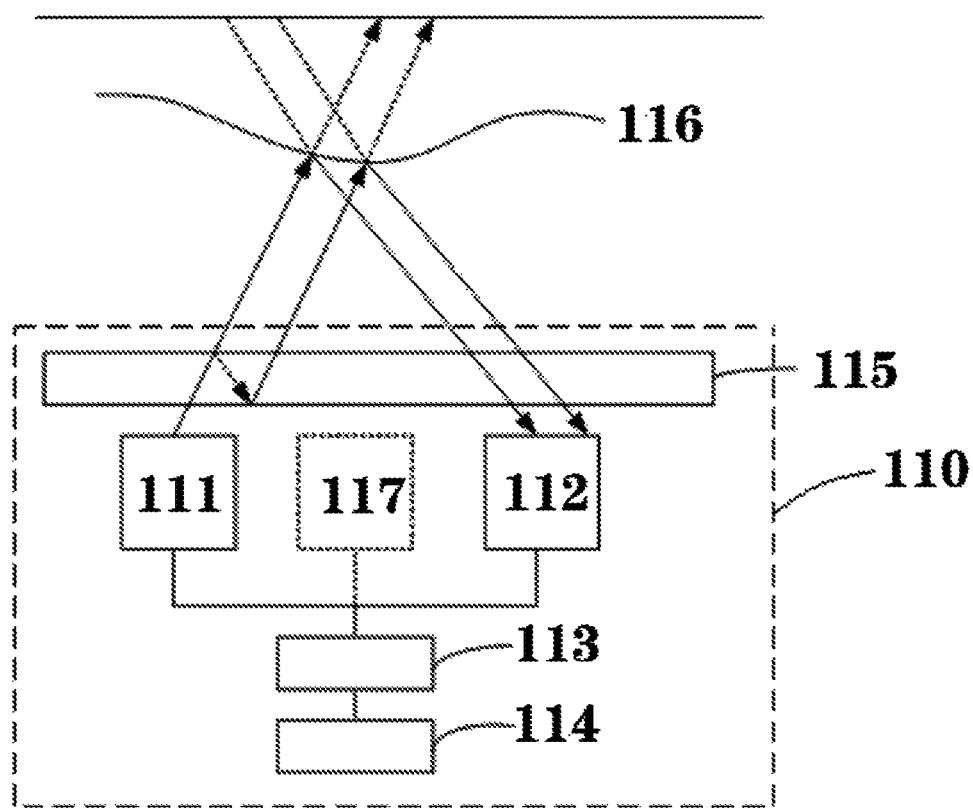
FIG. 11 is a schematic diagram of an under-screen system according to an embodiment of the present invention.

FIG. 11 is a schematic diagram of an under-screen system according to an embodiment of the present invention. As shown in FIG. 11, the under-screen system 110 of this embodiment includes an irradiation source 111, an acquisition module 112, a processor 113, a memory 114, and a display screen 115.

The irradiation source 111 is configured to emit an infrared beam to a target region 116 through the display screen 115.

The acquisition module 112 is configured to receive an optical signal that passes through the display screen 115 after being reflected by the target region, obtain an infrared image of the target region 116, and transmit the infrared image to the processor 113.

The processor 113 is configured to correct the infrared image by using preset correction parameter sets and the interference fringe correction method described in the solution of any of the foregoing embodiments.

The memory 114 is configured to store the correction parameter sets and a computer program executable on the processor.

It should be noted that, when either of the irradiation source 111 or the acquisition module 112 is located under the display screen 115, if the infrared image acquired by the acquisition module 115 includes interference fringes, the interference fringe correction method can still be used to correct the infrared images, which is not limited herein.

In an embodiment, if the irradiation source 111 emits a structured light beam to the target region 116 through the display screen 115, the under-screen system 110 further includes a floodlight module 117, where the floodlight module 117 projects a floodlight beam toward the target region 116 through the display screen 117. The acquisition module 112, on the one hand, receives a structured light optical signal reflected by the target region and transmits the structured light optical signal to the processor 113 to obtain a depth value of the target region. On the other hand, the acquisition module 112 receives a floodlight optical signal reflected by the target region to form an infrared image, and the infrared image is further corrected according to the foregoing method.

It should be understood that, if the irradiation source 111 emits an infrared beam to the target region 116 through the display screen 115, the under-screen system 110 does not need to perform supplementary lighting. The acquisition module can directly acquire the infrared image, and the infrared image is further corrected according to the foregoing method.

Figure 12:
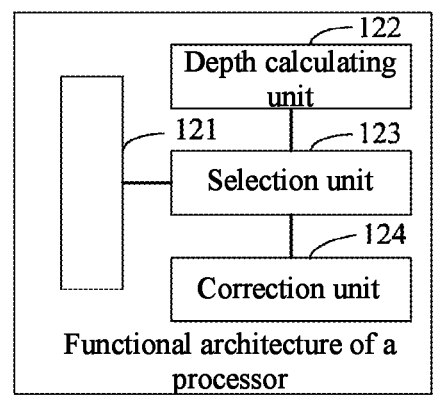
FIG. 12 is a schematic diagram of a functional architecture of a processor according to this application.

In an embodiment, the processor 113 performs steps in the embodiment of an interference fringe correction method, and more specifically, the steps may be performed by one or more units in the processor 113 to complete this application. Referring to FIG. 12, FIG. 12 is a schematic diagram of a functional architecture of a processor according to this application, the divisible units perform functions as follows:

an obtaining unit 121 is configured to obtain an infrared image of a target region acquired by an acquisition module;

a depth calculating unit 122 is configured to calculate an average depth value of the infrared image, where the average depth value refers to an average value of depth values corresponding to a plurality of to-be-corrected pixels in the infrared image;

a selection unit 123 is configured to select a target correction parameter set corresponding to the average depth value in the correction parameter sets of different photographing distances stored in a memory; and a correction unit 124 is configured to correct first pixel values of to-be-corrected pixels at the different coordinate positions in the infrared image according to different target correction parameters corresponding to the different coordinate positions in the target correction parameter set, to obtain a corrected image.

The under-screen system based on the interference fringe correction provided in this application selects the target correction parameter set according to the average depth value of the to-be-corrected image. The target correction parameters corresponding to the to-be-corrected pixels at different coordinate positions are obtained according to the target correction parameter set, and the first pixel values of the to-be-corrected pixels are corrected according to the target correction parameters. According to the foregoing manner, the first pixel values of the to-be-corrected pixels at different coordinate positions in the to-be-corrected image are adjusted based on the target correction parameter set corresponding to the average depth value, so as to alleviate the defect of poor image quality caused by the interference fringes.

A person skilled in the art may understand that the under-screen system includes, but is not limited to, the foregoing modules and combinations. FIG. 11 is merely an example of an under-screen system, and does not constitute a limitation of the under-screen system. The under-screen system may include more or fewer components than illustrated, or a combination of certain components, or different components.

The camera module includes an acquisition module and an irradiation source. The irradiation source includes a light source, an optical component (the optical component may include a diffractive optical element), and the like. The light source may be an edge emitting laser (EEL), a vertical cavity surface emitting laser (VCSEL), or may be a light source array composed of a plurality of light sources. A beam emitted by the light source can be visible light, an infrared light, or an ultraviolet light. The beam emitted by the light source can form a uniform, random or specially designed intensity distribution projection pattern on a reference plane. The acquisition module includes an image sensor and a lens unit. The lens unit receives a portion of the beam reflected by an object and forms an image on the image sensor. The image sensor may be an image sensor composed of a charge coupled device (CCD) sensor), a complementary metal-oxide-semiconductor (CMOS), an avalanche diode (AD), or a single-photon avalanche diode (SPAD).

The processor may be a central processing unit (CPU), and may also be another general purpose processor, a digital signal processor (DSP), an application specific integrated circuit (ASIC), a field-programmable gate array (FPGA) or another programmable logical device, a discrete gate, a transistor logic device, or a discrete hardware component. The general purpose processor may be a microprocessor, or the processor may be any conventional processor and the like.

The memory may be an internal storage unit of the under-screen system, for example, a hard disk or an internal memory of the under-screen system. The memory may alternatively be an external storage device of the under-screen system, for example, a removable hard disk, a smart media card (SMC), a secure digital (SD) card, or a flash card equipped on the under-screen system. Further, the memory may further include both an internal storage unit of the under-screen system and an external storage device. The memory is configured to store the computer program and another program and data that are required by the roaming control device. The memory may further be configured to temporarily store data that has been output or data to be output.

It should be understood that the order of the sequence numbers of the steps in the foregoing embodiments does not mean the order of execution, and the execution order of each process is determined according to functions and internal logic of the process, and should not be construed as any limitation on the implementation process of the embodiments of this application.

It is to be noted that, since content such as information exchange between and an execution process of modules/units of the foregoing apparatus belongs to the same idea as the method embodiment of this application, functions and technical effects may specifically refer to the method embodiment. Details are not described herein again.

A person skilled in the art may clearly understand that, for the purpose of convenient and brief description, only division of the foregoing functional units or module are used as an example for description. In a practical application, the functions may be allocated to and completed by different functional units or modules according to requirements. That is, an internal structure of the apparatus is divided into different functional units or modules to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the names of each functional unit and module are only for the purpose of distinguishing each other, and are not used to limit the protection scope of this application. For work processes of the units and modules in the system, reference may be made to corresponding processes in the foregoing method embodiments, and details are not described herein again.

An embodiment of this application further provides a computer-readable storage medium, storing a computer program, the computer program, when executed by a processor, implementing the steps of the method embodiments.

An embodiment of this application provides a computer program product, the computer program product, when run on a mobile terminal, causing the mobile terminal to implement the steps of the method embodiments.

When the integrated unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program comprises computer program code. The computer program code may be in source code form, object code form, executable file or some intermediate forms, or the like. The term computer-readable medium may at least include: any entity or apparatus, recording medium, computer memory, Read-Only Memory (ROM), Random Access Memory (RAM), electronic carrier signals, telecommunications signals, and software distribution medium that can carry computer program code to a photographing apparatus/living body detection device. For example, a USB flash drive, a removable hard disk, a magnetic disk, a compact disc, and the like. In some jurisdictions, according to legislation and patent practice, the computer-readable medium may not be an electric carrier signal and a telecommunication signal.

In the embodiments, descriptions of the embodiments have different emphases. As for parts that are not described in detail in one embodiment, reference can be made to the relevant descriptions of the other embodiments.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the embodiments provided in this application, it is to be understood that the disclosed apparatus/network device and method may be implemented in other manners. For example, the described embodiments of the apparatus/network device are merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position, or may be distributed on a plurality of network units.

It is to be understood that when used in this specification of this application and the appended claims, the terms "comprise" indicate the presence of described features, wholes, steps, operations, elements and/or components, but do not exclude the presence or addition of one or more other features, wholes, steps, operations, elements, components and/or a set thereof.

It is to be understood that a term "and/or" used in this specification of this application and the appended claims refers to one or more of any and all possible combinations of the associated items that is listed and includes the combinations.

As used in this specification of this application and the appended claims, the term "if" may be interpreted as "when" or "once" or "in response to determining" or "in response to detecting" according to the context. Similarly, the phrase "if determining" or "if detecting [described condition or event]" may be interpreted as "once determining" or "in response to determining" or "once detecting [described condition or event]" or "in response to detecting [described condition or event]" according to the context.

In addition, in the descriptions of this specification and appended claims of this application, the terms such as "first", "second", and "third" are used only to distinguish descriptions, and should not be understood as indicating or implying relative importance.

The reference terms such as "an embodiment" or "some embodiments" described in this specification of this application means that particular features, structures, or characteristics described with reference to the embodiment or embodiments may be included in one or more embodiments of this application. Therefore, the phrases "in one embodiment", "in some embodiments", "in other embodiments," "in some other embodiments", and the like in different parts of this specification are not necessarily refer to the same embodiment, but mean "one or more but not all embodiments", unless specifically emphasized otherwise. The terms "include", "comprise", "have" and variants thereof mean "including but not limited to" unless specifically emphasized otherwise.

The foregoing embodiments are merely for describing the technical solutions of this application, but not for limiting this application. Although this application is described in detail with reference to the foregoing embodiments, it should be appreciated by a person skilled in the art that, modifications may still be made to the technical solutions described in the foregoing embodiments, or equivalent replacements may be made to the part of the technical features, and such modifications or replacements will not cause the essence of corresponding technical solutions to depart from the spirit and scope of the technical solutions in the embodiments of this application and shall all fall within the protection scope of this application.

What is claimed is:

1. A method for correcting interference fringes, comprising:
  obtaining correction parameter sets of different photographing distances, wherein each of the correction parameter sets comprises different correction parameters corresponding to different coordinate positions;
  obtaining a to-be-corrected image and calculating an average depth value of the to-be-corrected image, wherein the average depth value comprises an average value of depth values corresponding to a plurality of to-be-corrected pixels in the to-be-corrected image;
  selecting a target correction parameter set corresponding to the average depth value from the correction parameter sets of different photographing distances; and
  correcting first pixel values of to-be-corrected pixels at the different coordinate positions in the to-be-corrected image according to different target correction parameters corresponding to the different coordinate positions in the target correction parameter set, to obtain a corrected image.

2. The method according to claim 1, wherein the obtaining correction parameter sets of different photographing distances comprises:
  acquiring a plurality of interference fringe images with different photographing distances, wherein each of the interference fringe images is acquired by a camera and comprises interference fringes, a light source irradiates a target plane through a display screen to form the interference fringes, each of the different photographing distances is between a plane perpendicular to an optical axis of the camera and the camera, and each of the interference fringe images represents pixel values of the interference fringes at different coordinate positions; and normalizing second pixel values of initial pixels in each of the interference fringe images, to obtain the correction parameter sets corresponding to the different photographing distances.

3. The method according to claim 2, wherein the normalizing second pixel values of initial pixels in each of the interference fringe images, to obtain the correction parameter sets corresponding to the different photographing distances comprises:

obtaining a maximum second pixel value in a respective interference fringe image of the interference fringe images; and dividing each of second pixel values of each of initial pixels in the respective interference fringe image by the maximum second pixel value, to obtain a corresponding correction parameter set.

4. The method according to claim 1, wherein the selecting a target correction parameter set corresponding to the average depth value from the correction parameter sets of different photographing distances comprises:

selecting, in the different photographing distances, a first photographing distance with a minimum difference from the average depth value; and using a correction parameter set corresponding to the first photographing distance as the target correction parameter set corresponding to the average depth value.

5. The method according to claim 1, wherein the correcting first pixel values of to-be-corrected pixels at the different coordinate positions in the to-be-corrected image according to different target correction parameters corresponding to the different coordinate positions in the target correction parameter set, to obtain a corrected image comprises:

obtaining a first correction parameter set according to a first formula, wherein the first formula is as follows:

$$I_b = I_a \left(\frac{L_a}{L_b}\right)^2$$

$I_a$ represents a target correction parameter in the target correction parameter set, $I_b$ represents a first correction parameter in the first correction parameter set, $L_a$ represents a photographing distance corresponding to the first correction parameter set, and $L_b$ represents the average depth value; and correcting the first pixel values of the to-be-corrected pixels at the different coordinate positions in the to-be-corrected image according to different first correction parameters corresponding to the different coordinate positions in the first correction parameter set, to obtain the corrected image.

6. The method according to claim 1, wherein the correcting first pixel values of to-be-corrected pixels at the different coordinate positions in the to-be-corrected image according to different target correction parameters corresponding to the different coordinate positions in the target correction parameter set, to obtain a corrected image comprises:

calculating a parallax between an interference fringe image corresponding to the target correction parameter set and the to-be-corrected image according to a second formula, wherein the second formula is as follows:

$$d = \left(1 - \frac{L_a}{L_b}\right)\frac{fb}{L_a}$$

d represents the parallax, $L_a$ represents a photographing distance corresponding to the target correction parameter set, $L_b$ represents the average depth value, b represents an optical axis distance between a camera and an irradiation source in a camera module, and f represents a focal length of the camera module;

adding a value of a coordinate position of each second pixel in the target correction parameter set to the parallax to obtain a second correction parameter set;

obtaining a third correction parameter set according to a third formula, wherein the third formula is as follows:

$$I_d = I_c \left(\frac{L_a}{L_b}\right)^2$$

$I_c$ represents the second correction parameter set, $I_d$ represents the third correction parameter set, $L_a$ represents a photographing distance corresponding to the target correction parameter set, and $L_b$ represents the average depth value; and correcting the first pixel values of the to-be-corrected pixels at the different coordinate positions in the to-be-corrected image according to different second correction parameters corresponding to the different coordinate positions in the third correction parameter set, to obtain the corrected image.

7. The method according to claim 6, wherein the correcting the first pixel values of the to-be-corrected pixels at the different coordinate positions in the to-be-corrected image according to different second correction parameters corresponding to the different coordinate positions in the third correction parameter set, to obtain the corrected image comprises:

dividing the first pixel values of the to-be-corrected pixels by second correction parameters corresponding to the to-be-corrected pixels, to obtain the corrected image.

8. An under-screen system, comprising: a display screen, an irradiation source, a camera, a processor, and a memory, wherein the irradiation source is configured to emit an infrared beam to a target region through the display screen;

the camera is configured to receive an optical signal that passes through the display screen after being reflected by the target region, obtain an infrared image of the target region, and transmit the infrared image to the processor;

the memory is configured to store correction parameter sets and a computer program executable on the processor; and the processor is configured to correct the infrared image by using the correction parameter sets and executing the computer program to perform operations comprising:

obtaining correction parameter sets of different photographing distances, wherein each of the correction parameter sets comprises different correction parameters corresponding to different coordinate positions;

obtaining a to-be-corrected image and calculating an average depth value of the to-be-corrected image, wherein the average depth value comprises an average value of depth values corresponding to a plurality of to-be-corrected pixels in the to-be-corrected image;

selecting a target correction parameter set corresponding to the average depth value from the correction parameter sets of different photographing distances; and correcting first pixel values of to-be-corrected pixels at the different coordinate positions in the to-be-corrected image according to different target correction parameters corresponding to the different coordinate positions in the target correction parameter set, to obtain a corrected image.

9. The system according to claim 8, wherein the infrared beam emitted by the irradiation source to the target region through the display screen is a structured light beam, the system further comprises a floodlight module configured to project a floodlight beam to the target region, and the camera is configured to acquire a floodlight optical signal reflected by the target region and obtain the infrared image of the target region.

10. The system according to claim 8, wherein the obtaining correction parameter sets of different photographing distances comprises:

acquiring a plurality of interference fringe images with different photographing distances, wherein each of the interference fringe images is acquired by a camera and comprises interference fringes, a light source irradiates a target plane through a display screen to form the interference fringes, each of the different photographing distances is between a plane perpendicular to an optical axis of the camera and the camera, and each of the interference fringe images represents pixel values of the interference fringes at different coordinate positions; and normalizing second pixel values of initial pixels in each of the interference fringe images, to obtain the correction parameter sets corresponding to the different photographing distances.

11. The system according to claim 10, wherein the normalizing second pixel values of initial pixels in each of the interference fringe images, to obtain the correction parameter sets corresponding to the different photographing distances comprises:

obtaining a maximum second pixel value in a respective interference fringe image of the interference fringe images; and dividing each of second pixel values of each of initial pixels in the respective interference fringe image by the maximum second pixel value, to obtain a corresponding correction parameter set.

12. The system according to claim 8, wherein the selecting a target correction parameter set corresponding to the average depth value from the correction parameter sets of different photographing distances comprises:

selecting, in the different photographing distances, a first photographing distance with a minimum difference from the average depth value; and using a correction parameter set corresponding to the first photographing distance as the target correction parameter set corresponding to the average depth value.

13. The system according to claim 8, wherein the correcting first pixel values of to-be-corrected pixels at the different coordinate positions in the to-be-corrected image according to different target correction parameters corresponding to the different coordinate positions in the target correction parameter set, to obtain a corrected image comprises:

obtaining a first correction parameter set according to a first formula, wherein
the first formula is as follows:

$$I_b = I_a \left(\frac{L_a}{L_b}\right)^2$$

$I_a$ represents a target correction parameter in the target correction parameter set, $I_b$ represents a first correction parameter in the first correction parameter set, $L_a$ represents a photographing distance corresponding to the first correction parameter set, and $L_b$ represents the average depth value; and correcting the first pixel values of the to-be-corrected pixels at the different coordinate positions in the to-be-corrected image according to different first correction parameters corresponding to the different coordinate positions in the first correction parameter set, to obtain the corrected image.

14. The system according to claim 8, wherein the correcting first pixel values of to-be-corrected pixels at the different coordinate positions in the to-be-corrected image according to different target correction parameters corresponding to the different coordinate positions in the target correction parameter set, to obtain a corrected image comprises:

calculating a parallax between an interference fringe image corresponding to the target correction parameter set and the to-be-corrected image according to a second formula, wherein
the second formula is as follows:

$$d = \left(1 - \frac{L_a}{L_b}\right)\frac{fb}{L_a}$$

d represents the parallax, $L_a$ represents a photographing distance corresponding to the target correction parameter set, $L_b$ represents the average depth value, b represents an optical axis distance between a camera and an illumination source in a camera module, and f represents a focal length of the camera module;

adding a value of a coordinate position of each second pixel in the target correction parameter set to the parallax to obtain a second correction parameter set;

obtaining a third correction parameter set according to a third formula, wherein
the third formula is as follows:

$$I_d = I_c \left(\frac{L_a}{L_b}\right)^2$$

$I_c$ represents the second correction parameter set, $I_d$ represents the third correction parameter set, $L_a$ represents a photographing distance corresponding to the target correction parameter set, and $L_b$ represents the average depth value; and correcting the first pixel values of the to-be-corrected pixels at the different coordinate positions in the to-be-corrected image according to different second correction parameters corresponding to the different coordinate positions in the third correction parameter set, to obtain the corrected image.

15. The system according to claim 14, wherein the correcting the first pixel values of the to-be-corrected pixels at the different coordinate positions in the to-be-corrected image according to different second correction parameters corresponding to the different coordinate positions in the third correction parameter set, to obtain the corrected image comprises:

dividing the first pixel values of the to-be-corrected pixels by second correction parameters corresponding to the to-be-corrected pixels, to obtain the corrected image.

16. A non-transitory computer-readable storage medium, storing a computer program, wherein the computer program, when executed by a processor, causes the processor to perform operations comprising:

obtaining correction parameter sets of different photographing distances, wherein each of the correction parameter sets comprises different correction parameters corresponding to different coordinate positions;

obtaining a to-be-corrected image and calculating an average depth value of the to-be-corrected image, wherein the average depth value comprises an average value of depth values corresponding to a plurality of to-be-corrected pixels in the to-be-corrected image;

selecting a target correction parameter set corresponding to the average depth value from the correction parameter sets of different photographing distances; and correcting first pixel values of to-be-corrected pixels at the different coordinate positions in the to-be-corrected image according to different target correction parameters corresponding to the different coordinate positions in the target correction parameter set, to obtain a corrected image.

17. The medium according to claim 16, wherein the obtaining correction parameter sets of different photographing distances comprises:

acquiring a plurality of interference fringe images with different photographing distances, wherein each of the interference fringe images is acquired by a camera and comprises interference fringes formed by a light source irradiating a target plane through a display screen, each of the different photographing distances is between a plane perpendicular to an optical axis of the camera and the camera, and each of the interference fringe images represents pixel values of the interference fringes at different coordinate positions; and normalizing second pixel values of initial pixels in each of the interference fringe images, to obtain the correction parameter sets corresponding to the different photographing distances.

18. The medium according to claim 17, wherein the normalizing second pixel values of initial pixels in each of the interference fringe images, to obtain the correction parameter sets corresponding to the different photographing distances comprises:

obtaining a maximum second pixel value in a respective interference fringe image of the interference fringe images; and dividing each of second pixel values of each of initial pixels in the respective interference fringe image by the maximum second pixel value, to obtain a corresponding correction parameter set.

19. The medium according to claim 16, wherein the selecting a target correction parameter set corresponding to the average depth value from the correction parameter sets of different photographing distances comprises:

selecting, in the different photographing distances, a first photographing distance with a minimum difference from the average depth value; and using a correction parameter set corresponding to the first photographing distance as the target correction parameter set corresponding to the average depth value.

20. The medium according to claim 16, wherein the correcting first pixel values of to-be-corrected pixels at the different coordinate positions in the to-be-corrected image according to different target correction parameters corresponding to the different coordinate positions in the target correction parameter set, to obtain a corrected image comprises:

obtaining a first correction parameter set according to a first formula, wherein the first formula is as follows:

$$I_b = I_a \left(\frac{L_a}{L_b}\right)^2$$

$I_a$ represents a target correction parameter in the target correction parameter set, $I_b$ represents a first correction parameter in the first correction parameter set, $L_a$ represents a photographing distance corresponding to the first correction parameter set, and $L_b$ represents the average depth value; and correcting the first pixel values of the to-be-corrected pixels at the different coordinate positions in the to-be-corrected image according to different first correction parameters corresponding to the different coordinate positions in the first correction parameter set, to obtain the corrected image.

* * * * *